US010120567B2

(12) United States Patent
Yaron et al.

(10) Patent No.: US 10,120,567 B2
(45) Date of Patent: Nov. 6, 2018

(54) SYSTEM, APPARATUS AND METHOD FOR VEHICLE COMMAND AND CONTROL

(71) Applicant: INPRIS INNOVATIVE PRODUCTS FROM ISRAEL LTD, Jerusalem (IL)

(72) Inventors: Ben Etzion Yaron, Efrat (IL); Nissan Yaron, Efrat (IL)

(73) Assignee: INPRIS INNOVATIVE PRODUCTS FROM ISRAEL LTD, Jerusalem (IL)

( * ) Notice: Subject to any disclaimer, the term of this patent is extended or adjusted under 35 U.S.C. 154(b) by 0 days.

(21) Appl. No.: 15/090,061

(22) Filed: Apr. 4, 2016

(65) Prior Publication Data

US 2016/0291862 A1 Oct. 6, 2016

Related U.S. Application Data

(60) Provisional application No. 62/142,170, filed on Apr. 2, 2015.

(51) Int. Cl.
*G06T 11/00* (2006.01)
*G06F 3/0488* (2013.01)
(Continued)

(52) U.S. Cl.
CPC .......... *G06F 3/04883* (2013.01); *B60K 35/00* (2013.01); *B60K 37/06* (2013.01);
(Continued)

(58) Field of Classification Search
None
See application file for complete search history.

(56) References Cited

U.S. PATENT DOCUMENTS

| 5,642,108 A | 6/1997 | Gopher et al. |
| 6,570,557 B1 | 5/2003 | Westerman et al. |

(Continued)

FOREIGN PATENT DOCUMENTS

| WO | 2010/016065 | 2/2010 |
| WO | 2010/051452 | 5/2010 |
| WO | 2017/029555 | 2/2017 |

OTHER PUBLICATIONS

[Author unknown] How it works, Internal publication by Celluon, Inc. www.celluon.com, visited Mar. 31, 2011.

(Continued)

*Primary Examiner* — Truc M Do
(74) *Attorney, Agent, or Firm* — The Dobrusin Law Firm, P.C.

(57) ABSTRACT

The teachings herein generally relate to systems, methods and apparatuses useful in vehicle command and control. For example, a vehicle control system according to the teachings herein may include one or more touch panels connected to a steering wheel and being in communicative connection to a vehicle control processor. Preferably, the touch panel(s) are configured face down, and adapted to track touches (e.g., simultaneous touches) by multiple individually identified fingers. As another example, an apparatus for vehicle command and control, according to the teachings herein, may include one or more face down touch panels positioned to be touched by a driver's fingers while the driver's thumb holds or otherwise contacts a steering wheel. Preferably, the touch panels are in communication with a view screen enabled to display an indication of touch actions by multiple fingers touching the panels. The touch panels preferably include touch sensors adapted to identify touches of multiple fingers of a user. Preferably, the touch sensors are associated with software for identifying and tracking touches (e.g., move- (Continued)

ments) of every finger individually out of multiple fingers and determining whether each touch is a sliding movement or a non-sliding contact.

19 Claims, 7 Drawing Sheets

(51) Int. Cl.
   *B60K 35/00* (2006.01)
   *G06F 3/0484* (2013.01)
   *B60K 37/06* (2006.01)

(52) U.S. Cl.
   CPC .......... *G06F 3/04847* (2013.01); *G06T 11/00* (2013.01); *B60K 2350/1024* (2013.01); *B60K 2350/1052* (2013.01); *B60K 2350/928* (2013.01); *G06F 2203/04804* (2013.01); *G06F 2203/04808* (2013.01)

(56) References Cited

U.S. PATENT DOCUMENTS

| | | | |
|---|---|---|---|
| 7,030,861 B1 | 4/2006 | Westerman et al. | |
| 9,164,619 B2* | 10/2015 | Goodlein | G06F 3/0488 |
| 9,261,972 B2 | 2/2016 | Yaron et al. | |
| 9,459,795 B2 | 10/2016 | Yaron et al. | |
| 9,481,246 B2* | 11/2016 | Kim | B60K 37/06 |
| 9,652,146 B2 | 5/2017 | Yaron et al. | |
| 2002/0160342 A1 | 10/2002 | Castro | |
| 2006/0155429 A1* | 7/2006 | Boone | B60K 35/00 701/1 |
| 2007/0177807 A1 | 8/2007 | Elias et al. | |
| 2008/0015115 A1* | 1/2008 | Guyot-Sionnest | G06F 3/014 506/24 |
| 2008/0320410 A1 | 12/2008 | Whytock et al. | |
| 2009/0237361 A1 | 9/2009 | Mosby et al. | |
| 2011/0040455 A1* | 2/2011 | Lathrop | B60K 35/00 701/48 |
| 2011/0169750 A1* | 7/2011 | Pivonka | B60K 35/00 345/173 |
| 2011/0210943 A1 | 9/2011 | Zaliva | |
| 2011/0234503 A1 | 9/2011 | Fitzmaurice et al. | |
| 2012/0162112 A1 | 6/2012 | Cho | |
| 2012/0212421 A1 | 8/2012 | Honji | |
| 2012/0268389 A1 | 10/2012 | Yaron et al. | |
| 2013/0050114 A1* | 2/2013 | Backman | B60K 37/06 345/173 |
| 2013/0194201 A1 | 8/2013 | Zanone et al. | |
| 2013/0321337 A1 | 12/2013 | Graham | |
| 2014/0160035 A1 | 6/2014 | Sauer et al. | |
| 2017/0010799 A1 | 1/2017 | Yaron et al. | |
| 2017/0090600 A1 | 3/2017 | Yaron et al. | |

OTHER PUBLICATIONS

Morris, Chris; http://fortune.com/2015/01/08/texting-and-driving-your-next-car-may-come-with-a-punishment-device/: last visited Apr. 4, 2016.
Copending U.S. Appl. No. 13/091,158, filed Apr. 21, 2011, published as US2012/0268389.
Copending U.S. Appl. No. 14/976,005, filed Dec. 21, 2015.
International Search Report and Written Opinion for Application No. PCT/IB2016/001256 dated Mar. 17, 2017.
Potentially Related U.S. Appl. No. 15/241,381, filed Aug. 19, 2016, published as US2017/010799 on Jan. 12, 2017.
Potentially Related U.S. Appl. No. 15/276,243, filed Sep. 26, 2016, published as US2017/090600 on Mar. 30, 2017.
International Search Report and Written Opinion for Application PCT/IB2016/001256 dated Mar. 17, 2017.
International Preliminary Report of Patentability for Application PCT/IB2016/001256 dated Feb. 20, 2018.
Non-Final Office Action for U.S. Appl. No. 15/276,243 dated Mar. 22, 2018.
Non-Final Office Action for U.S. Appl. No. 15/241,381 dated Jan. 23, 2018.

* cited by examiner

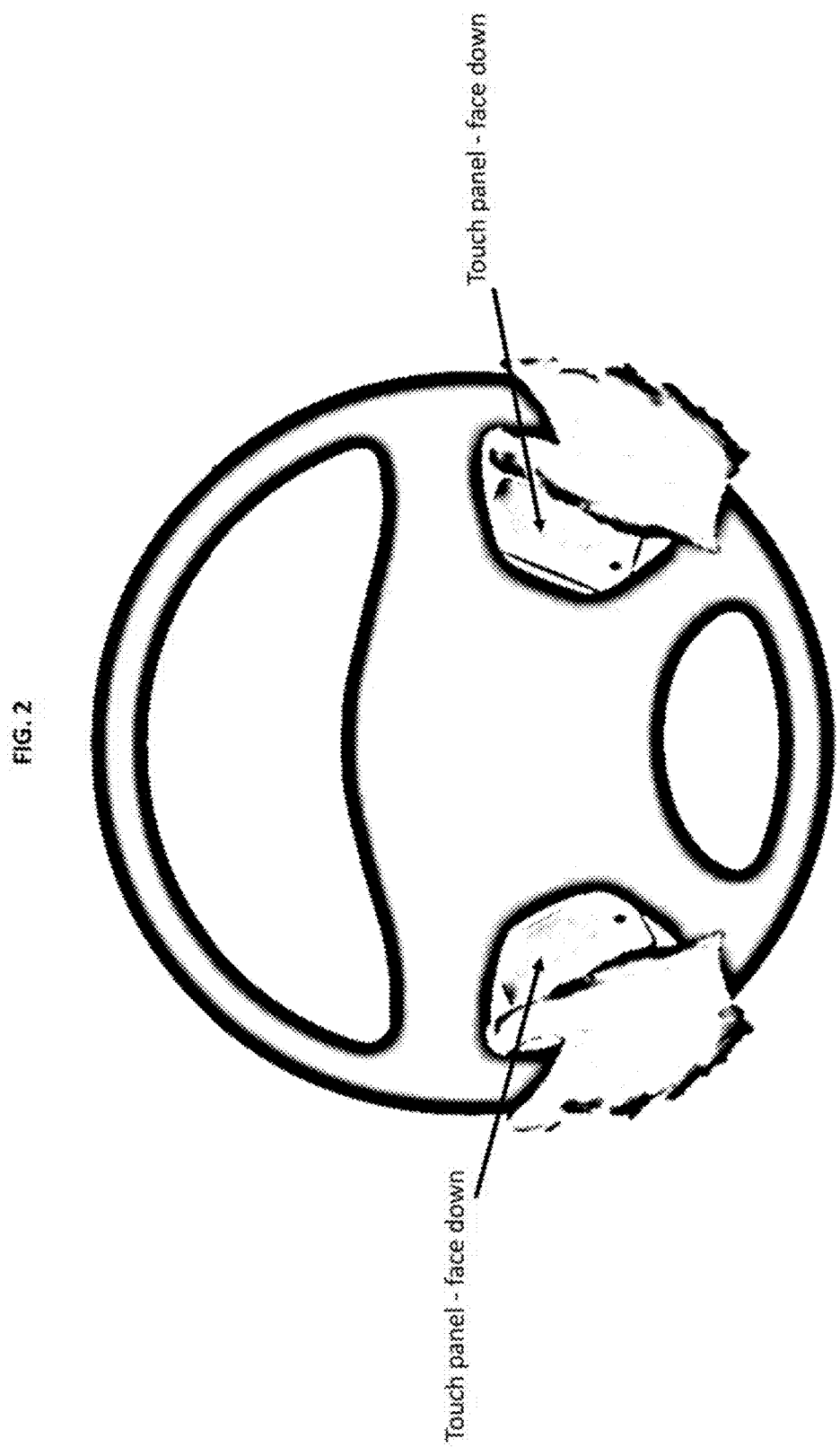

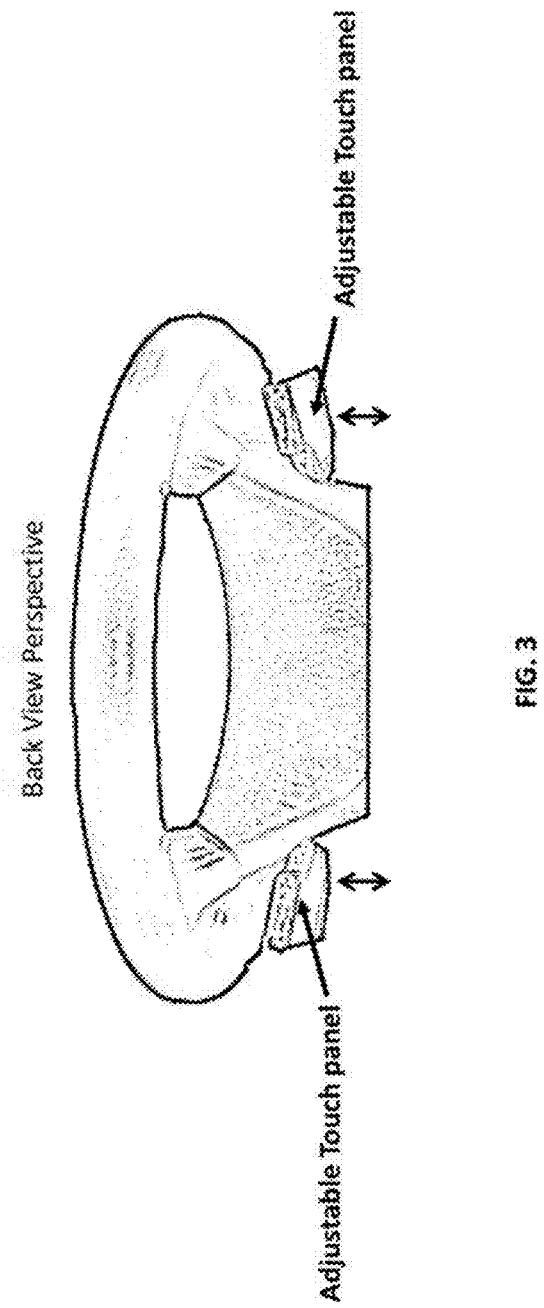

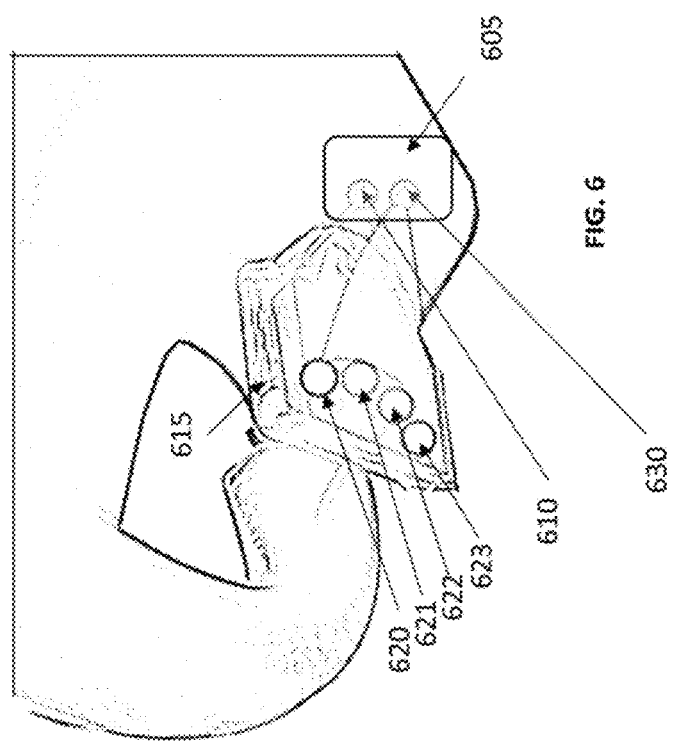

SYSTEM, APPARATUS AND METHOD FOR VEHICLE COMMAND AND CONTROL

FIELD

The teachings herein relates to systems, methods and apparatuses useful in vehicle command and control.

BACKGROUND

As can be seen from the article "Texting and driving? Your next car may come with a punishment device", Fortune, Jan. 8, 2015, by Chris Morris: "As cars and trucks get smarter, auto manufacturers are struggling to find a balance between passenger safety and the increasing consumer demand for entertainment and communication. Every day, about 9 people are killed and more than 1,153 people are injured in crashes that are reported to involve a distracted driver, according to the CDC. And the NTSB has listed distracted driving — everything from cell phones to in-dash systems and other hands-free devices — on its 2014"Most Wanted" list, which identifies the year's biggest transportation challenges."

Vehicle command and control systems have recently embraced the use of touch screens, primarily on central panels on the car dashboard, and more recently on the steering wheel.

It is common today that drivers of vehicles have and operate smartphones while driving, to have conversations, operate navigation programs and more. In addition, today's drivers are required to operate a variety of options for automotive devices, which require the touching of screens or buttons with the driver's fingers, generally requiring diverting attention of the driver's attention from the road ahead, in the direction of the steering wheel, or the direction of the center console of the vehicle.

For example, a driver may be required to or want to control Air Conditioning, the vehicle radio, cruise control etc. Recently, many car manufacturers have opened their vehicle computer systems up to enable connection and control through $3^{rd}$ party applications.

Of course, it is also common for drivers to be operating smartphones, touch panels, tablets etc. to navigate, read, send messages, surf the Internet and more, even though we know how dangerous these attention diversions are.

Of course different vehicles have different command and control capabilities, but a primary ongoing problem is the driver's head movement towards interactive touchscreens, whether on the steering wheel, smartphone or central console, causing a direct diversion of attention of the driver, and a breaking of viewing the road ahead.

It would be highly advantageous to have a system, apparatus or method for enabling effective command and control of vehicles using touchscreens, where the driver is not required to lift their hands from the steering wheel, or their gaze from the road.

SUMMARY

There is provided, in accordance with an embodiment of the present invention, a system, apparatus, and method for enabling effective command and control of vehicles using touchscreens, where the driver is not required to lift their hands from the steering wheel, or their gaze from the road.

According to some embodiments, a vehicle control system is provided, that may include one or more touch panels connected to the steering wheel, or alternative locations proximate to the driver of a vehicle, and being in communicative connection to the vehicle control processor, wherein the touch panels are configured face down, and adapted to track movements by multiple individually identified fingers.

In some embodiments, the system further comprises one or more view screens for displaying a touch related user interface, the interface adapted to show indications of identified fingers on the touch panels, and function options available for each identified finger.

According to some embodiments, a vehicle management method is provided, that may include: placing one or more fingers on one or more touch panels connected to the steering wheel, or to alternative locations proximate to the driver of a vehicle; Positioning a repositionable touch zone for each finger on the panel, each touch zone being associated with a separate finger of a driver's hand and positioned relative to the other touch zones in an ergonomic arrangement enabling the driver to simultaneously contact all touch zones with the associated fingers; projecting a vehicle control function for each identified finger on the panel, on a screen; receive an indication of finger contact on at least one of the touch zones; receive an indication, for each finger contact, of which touch zone received the finger contact and whether the finger contact was a sliding or a non-sliding contact; receive an indication of the direction of the sliding contact for each sliding contact; and selecting a primary vehicle control function with a finger, without having to lift a hand off the steering wheel, or having to look at the touch panel.

In some embodiments, the method may include placing one or more fingers on one or more touch panels placed near the driver at a comfortable distance; Positioning a repositionable touch zone for each finger on the panel; projecting a vehicle control function for each identified finger on the panel, on a screen; receive an indication of finger contact on at least one of the touch zones; receive an indication, for each finger contact, of which touch zone received the finger contact and whether the finger contact was a sliding or a non-sliding contact; receive an indication of the direction of the sliding contact for each sliding contact; and selecting a primary vehicle control function with a finger, without having to look at the touch panel.

In some embodiments, the method further comprises entering the selected function and providing advanced command entry functionality for each identified finger, within the selected primary function.

In some embodiments, the method further comprises a function for enabling safe texting while driving, including: placing fingers on a panel positioned face down on a steering wheel, positioning a repositionable touch zone for each identified finger, displaying a representation of the identified fingers on a transparent view panel, the view panel situated so as to allow the driver to view the panel while looking at the road ahead of the vehicle, and a user interface on the vehicle viewing panel adapted to provide easy to navigate characters for each of the identified fingers, while the driver can keep his/her hands on the steering wheel.

According to some embodiments, an apparatus or device for vehicle command and control is provided, that may include one or more face down touch panels positioned to be touched by a driver's fingers while the driver's thumb holds the steering wheel; wherein the panels are in communication to a view screen, enabled to display an indication of touch actions by multiple fingers touching the panels; wherein the panels include touch sensors adapted to identify touches of multiple fingers of a user; and wherein the touch sensors are associated with software for individually identifying and tracking touches of multiple fingers.

In some embodiments, the apparatus further comprises a keypad projector module to project a virtual interactive keypad/touch panel on a panel surface.

In some embodiments, the apparatus software is an Application that is in communication with a vehicle control application running on a computing system, the application adapted to monitor simultaneous touch of multiple fingers on the touch screen panel(s), to enable each of a driver's fingers to enter vehicle control related instructions for the vehicle, while keeping the driver's hands on the steering wheel and his or her eyes looking substantially at the road at all times.

In some embodiments, the apparatus touch panels are positioned on the underside of the touch panels, so as to disallow user viewing of the touch panels, and wherein a User interface for vehicular command is provided on an associated view screen, the view screen to provide indications of the user's touches on the apparatus.

In some embodiments, the apparatus software is adapted to identify finger generated gestures for controlling vehicle functions without lifting a driver's hands off the steering wheel.

In some embodiments, the apparatus multi-touch panels are connected to a vehicle steering wheel, adapted to be repositionable to as to enable ergonomic touching by up to four of a driver's fingers on each touch panel while holding the steering wheel with the driver's thumb.

In some embodiments, the apparatus multi-touch panels are part of a Kit for universal vehicle command and control, comprising one or more wireless communication enabled touch screen panels adapted to be connected to a vehicle steering wheel, such that the panels may be ergonomically positioned to allow the vehicle driver's thumb to rest on the steering wheel, and have the four other fingers rest behind the steering wheel or on the underside of the panels.

In some embodiments, the kit includes a link to associated vehicle command and control Application software to connect the driver's touches on the panel to the vehicle computing system.

In some embodiments, the apparatus further comprises a device or element for virtual touch screen projection onto the touch panels.

BRIEF DESCRIPTION OF THE DRAWINGS

The principles and operation of the system, apparatus, and method according to the present invention may be better understood with reference to the drawings, and the following description, it being understood that these drawings are given for illustrative purposes only and are not meant to be limiting, wherein:

FIG. 2 is a front view graphic illustration of an example of multiple touch panel devices connected to a vehicle steering wheel, according to some embodiments;

FIG. 3 is a back view graphic illustration of an example of multiple touch panel devices connected to a vehicle steering wheel, according to some embodiments;

FIG. 6 is an illustrative drawing showing a projection device that may be used in a system or apparatus according to the teachings herein;

Figure 1A:
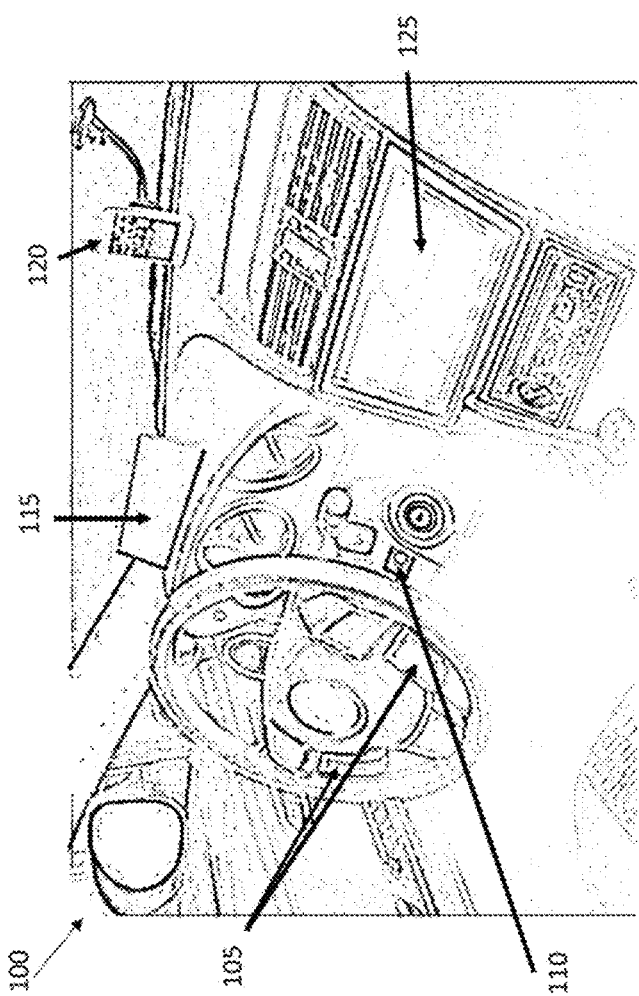
FIGS. 1A and 1B are graphic and schematic illustrations of an example of a system for enhanced command and control of vehicles, according to some embodiments.

It will be appreciated that for simplicity and clarity of illustration, elements shown in the drawings have not necessarily been drawn to scale. For example, the dimensions of some of the elements may be exaggerated relative to other elements for clarity. Further, where considered appropriate, reference numerals may be repeated among the drawings to indicate corresponding or analogous elements throughout the serial views.

DETAILED DESCRIPTION

The following description is presented to enable one of ordinary skill in the art to make and use the invention as provided in the context of a particular application and its requirements. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In other instances, well-known methods, procedures, and components have not been described in detail so as not to obscure the present invention.

As described above, the usage of touch and view panels in vehicles causes the driver's head to move towards these interactive screens, whether on the steering wheel, smartphone or central console, causing a direct distraction of the driver, and a breaking of viewing the road ahead, thereby endangering the driver, the other passengers, and other vehicles or pedestrians on the road.

Non-limiting embodiments of the invention provide a system, apparatus and method, including one or more touch panels connected the steering wheel, or to alternative locations proximate to the driver of a vehicle, facilitating substantially blind data entry capability to enable the driver to enter various vehicle commands using gestures or movements of fingers on one or more multi-touch panels simultaneously, substantially without having the lift a hand off the steering wheel, and further, without the driver needing to look at the touch panels in order to find the locations to enter commands.

Figure 1B:
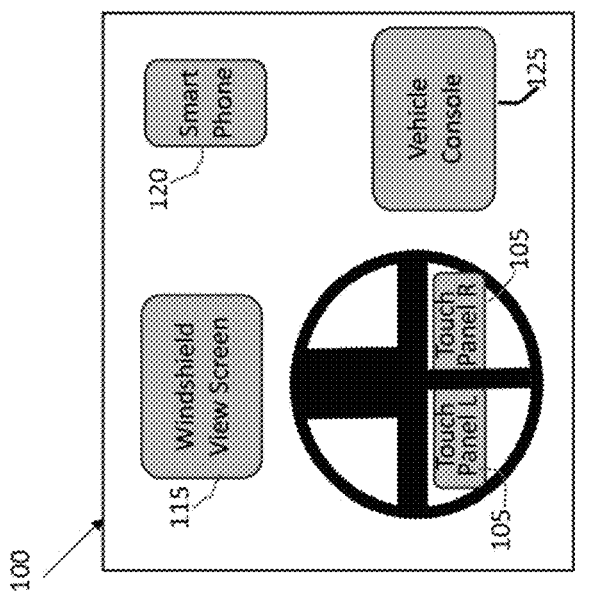

Reference is now made to FIGS. 1A-1B which are roughly equivalent graphic and schematic illustrations of an example of a touch based vehicle command system 100 for enhanced command and control of vehicles, according to some embodiments. As used herein, the term "command and control" may refer to any commands, instructions, data entry, vehicle management etc. that may be used by a vehicle user to help operate the vehicle, for example, managing vehicle speed, air conditioning, media and entertainment control, communications, windows status, parking, data management, computing system interaction, navigation, safety management, mechatronics, artificial intelligence, etc., to assist a vehicle's operator. As can be seen, one or more touch screens or panels 105 may be positioned face down (multi-touch sensitive panels facing away from the drivers face) on the steering wheel, optionally on both sides of the wheel or wherever else may be convenient for the driver. Optionally, an on/off switch 110 may be positioned in proximity to the touch panels, or elsewhere as may be convenient, to turn on or off the touch based vehicle command system. One or more view panels may be configured to show the driver the command functions available for choosing via the touch panels. For example, the view panel or panels may be configured or set up to be viewable by the driver on a substantially transparent windshield screen 115, on the driver's smart phone or device 120, the vehicle's central console 125, etc. These panels may or may not have touch screens, but the entry of data or commands may be entirely or partially driven by the drivers touching of the touch panels, and not necessarily requiring touching of the view panels, function buttons, switches etc.

According to some embodiments, the touch panels may be configured on the steering wheel, whereby the touch panels are powered via the vehicle power system. The touch screens may further be connected to the vehicle computer system via a communications cable or wire. In other embodiments the panels may be wirelessly connected to the vehicles computer or command system, for example, using Bluetooth, Wi-Fi, Infrared, or other wireless communication protocols used for exchanging data over short distances.

In some embodiments, the panel(s) may be positioned at alternative locations proximate to the driver of a vehicle. For example, such a setup may enable placing one or more fingers on one or more touch panels placed near the driver in a comfortable distance; positioning a repositionable touch zone for each finger on the panel; projecting a vehicle control function for each identified finger on the panel, on a screen; and selecting a primary vehicle control function with a finger, without having to look at the touch panel.

FIG. 2 is a front view graphic illustration of an example of multiple touch panel devices connected to a vehicle steering wheel, according to some embodiments.

Although FIG. 2 shows a typical configuration of 2 touch panels at positions considered to be convenient and safe for most drivers, the positions may be changed, and fewer or more touch panels may be used. In one example, a physically challenged driver may be able to hold the wheel at a certain position, in which case the panel(s) may be configured to be positioned according to the driver's needs.

FIG. 3 is a back view graphic illustration of an example of multiple touch panel devices connected to a vehicle steering wheel, according to some embodiments. The arrows shown in the figure are indicative of the ability to adjust the panels up and down, or in other directions, to allow for comfortable access by the driver, and to provide ergonomic positioning relative to the hand(s) positioning, size etc. of the driver.

Figure 5:
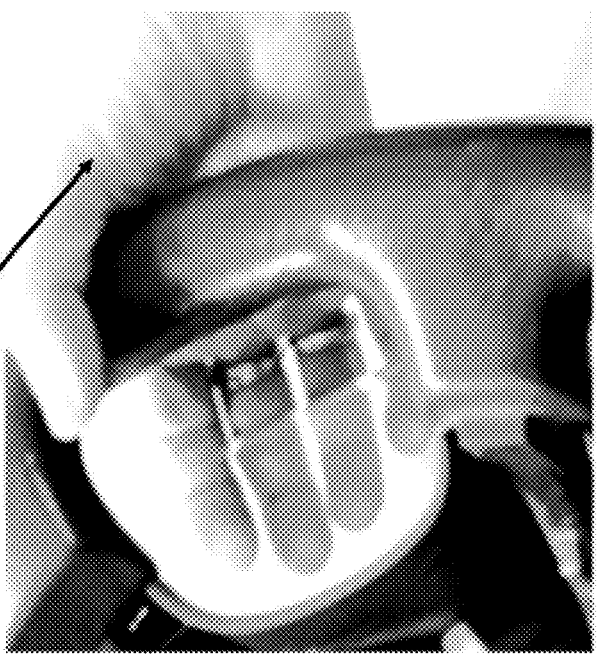
FIGS. 4 and 5 are graphical illustrations of examples of touch panels being engaged by a driver's hand, according to some embodiments.
Figure 4:
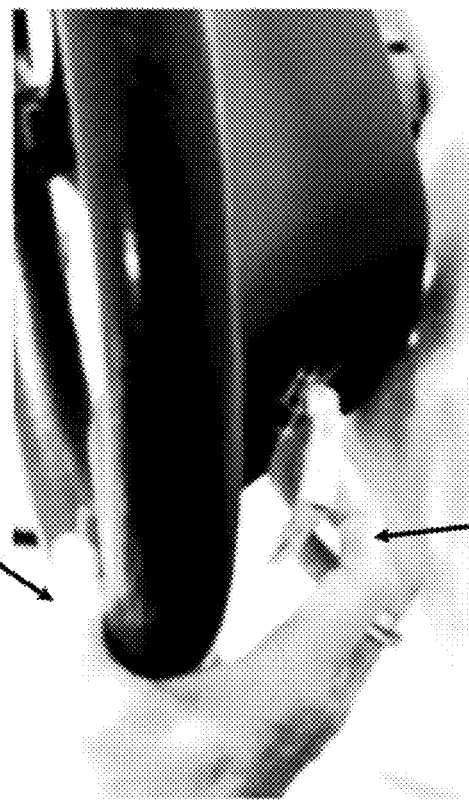

FIGS. 4 and 5 are graphical illustrations of examples of touch panels being engaged by a driver's hand, according to some embodiments. As can be seen, under the steering wheel and on either side, one or more touchscreens or touch panels may be installed upside down (face down). These touch screens are adjustable having a hinge, lever, bending capacity, to fit the panels to the driver's hand size, angle of engagement etc. For example, the panels are adapted to be adjustable in angle, slope, height etc., in order to provide steering wheel grip convenience and convenience of operation fingers. In some embodiments the panels may be configured at the hand resting positions 4 hours and 8 hours, generally considered to be safe resting positions, or other selected resting positions, as may be required. In some embodiments the panels may be configured to operate only when the vehicle is driving in the direction of 85-95 degrees, therefore not during sharp turns etc. In some embodiments the panels may be configured to operate only when the vehicle is driving in a certain speed range. In some embodiments the touch screen panels may be operated when the driver's thumb rests on the steering wheel, and the tips of the other fingers of the hand(s) touch the touch panels from below. In this way, up to 4 fingers on each hand can easily and safely engage the touch panels, while the driver still keeps his or her hands solidly and safely on the wheel, supported by the thumb(s) and the web typed area or arch between the thumb and index finger (pointer finger or forefinger), referred to as the thenar space.

In some embodiments the apparatus for enabling effective command and control of vehicles can be operated by movement of multiple fingers on the one or more touch panels, while holding the steering wheel. Each finger on the panel may be simultaneously identified by the apparatus, and a graphical menu may be provided for each identified finger, enabling each finger, at its current location or position, to be able to enter a command or gesture for a selected command or control function of the vehicle. For example, each finger may be able to touch or move to provide an instruction, without lifting the handle off the steering wheel or having to look at the touch panel to know where the finger is placed or what part of the panel it is touching.

In some embodiments the panels are communicatively connected to one or more display screens or view panels, generally position-able in a safe location to allow the driver to see the view of the road while viewing the command and control functions and operations. For example, a substantially transparent view panel may be placed in front of the driver, on the top of the dashboard or on or against the front windshield partially or fully in the driver's view, to allow the driver to see key functionality aspects without substantially removing his or her gaze from the road ahead. In other embodiments the view panel may be the driver's smart phone, tablet, phablet, communications device, computing device, central vehicle console, vehicle dashboard, or wherever else the driver or car manufacturer may want to place the view panel. In some embodiments, the view panel may not be a touch screen, and just be a viewing screen, so as to discourage the driver from taking their hand(s) off the wheel, and their gaze off the road, to enter a command on the screen, and rather enter any needed commands using the finger other than the thumb(s), while the hand is still holding the steering wheel. In some embodiments, depending on the settings, the display on the view panel may disappear or fade if the touch panel(s) are not engaged for a pre-determined time interval.

As can be seen in the examples shown in FIGS. 1-5, the touch based vehicle command system 100 may be configured to enable the driver of a vehicle to be able to enter a substantial number of vehicle commands and data, as well as optionally enter smart phone commands and data, navigation commands and data, music commands etc., substantially without removing hands from the steering wheel or needing to look at the touch panels at all. As described, the touch panels are typically configured to be face down, to discourage the driver from needing to look at the panels at all, to enable minimal or close to zero visual distraction. In some embodiments the vehicle computer system will be required to run code or instructions, optionally on a configurable Application, for processing and displaying the entered commands, characters or data via the touch panels. In further embodiments the vehicle computer system may supply an API or code to enable external computing devices to interact with the vehicle computer system. In such a case, the driver may use their smartphone or other computing or communications device to process the touch panel generated commands, data, character entry etc., and use the driver's device to interact with the vehicle computer system.

In some embodiments, substantially any vehicle functions (e.g., radio control, air conditioning, cruise control, navigation control etc.) can be enabled using the touch panels, thereby avoiding the need for specialized controls, buttons, switches etc. on the steering wheel, vehicle dashboard or console etc. In further embodiments the driver may control other computer systems or devices, such as smartphones, tablets, navigation devices, media devices etc., using the touch based vehicle command system 100. In such cases, the touch panels must be communicatively connected to the required computer device, and the device must further run an application for processing and displaying the entered commands, characters or data via the touch panels. In still further embodiments the system software for enabling vehicle command and control may be a special App in the driver's smartphone, or a special app from the vehicle manufacturer, integrated into the operation of the vehicle's touchscreen.

According to some embodiments, blind touch typing technology may be integrated into the computer processing of the user's touches on the touch panel, to facilitate blind touch typing, such that the user does not need to look at the touch panel to enter commands or characters. For example, Inpris Ltd. Technology (see www.inprisltd.com) Ergonomic Motion Detection (EMD) technology may be integrated, to allow each identified finger to form a command or character entry mini keyboard or keypad, wherever the finger is placed on the panel. For example, EMD technology or related technologies may be used to identify and track the movements of each individual finger, enabling a driver with multiple fingers on a touch panel to generate a substantial number of commands with movements of the fingers on the touch panel(s). In one example, when the driver is using 4 fingers on a touch panel, there is a need to calibrate the 4 fingers each time the panel is touched, to recognize the place of each finger on the panel. In such a case, the total various gestures that can be performed by a combination of gestures like touch/left/right/up/down/none—with 1-3 fingers at the same time from 4 fingers of one hand=860 gestures ((6*6*6)−1)*4. In other cases, the driver may typically need only few simple gestures to activate the various options available to him or her, most of them with one finger, since every finger is recognized by the software after the calibration, and therefore, for example, a specific movement of the ring finger can cause a different function for the vehicle or connected device, than a similar movement of the little finger. By creating different commands using different fingers, each individually recognized by EMD or related technologies, a user can take control of substantially any touch-screen device using one or more touch panels, without having to look at the touch panels to enter commands, data or characters. Further, the motion detection technology as described in U.S. Pat. No. 9,261,972, by the same inventors, is herein fully incorporated by reference.

In some embodiments, the touch panels may be substantially non-sensitive panels, such as standard plastic, Perspex, metal etc., on which a touch sensitive projection module may be configured. For example, as can be seen with reference to FIG. 6, a projection keyboard or keypad module may be used, to enable multi-finger touch tracking on a panel without requiring the panel to be a touch sensitive screen or panel. As can be seen, in one example, an infrared light 610 from a projection device or element 605 may be used to project an infrared virtual keyboard, keypad, touch panel or touch screen-like surface on the bottom of a standard panel 615, for example, made from glass, plastic, Perspex, metal etc. The driver's fingers placed on the bottom of the touch panel, for example, represented by the dots 620, 621, 622 and 623 can subsequently be identified by sensor 630, which is capable to compute the positions of multiple fingers, and the movement of the identified fingers. In this way a standard panel in combination with projection technology and tracking can allow the driver's fingers to be identified and tracked, and thereby enable the driver to use his or finger movements to enter commands, data, characters etc., while keeping their hands on the steering wheel, and without needing to look at the touch panel to enter the commands. See, for example, htto://www.celluon.com, as an example of a projection screen technology.

In further embodiments, the touch screen panels may function as remote controls for critical car functions, as well as for interacting with smart phones or other user devices. In further examples, the touch screen panels may be used to provide instructions, enter characters etc. on any view screens or panels, whether these view screen are touch sensitive or not.

In other embodiments, the touch screen panels may function as remote controls for critical car functions, such that these functions do not require dedicated buttons or switches, for example, on the steering wheel or dashboard. In some examples, the touch based vehicle command system 100 with the touch screen panels may be used to provide command and control functions to a vehicle that may not have dedicated buttons or switches, thereby enhancing the vehicle functionality. In this way, a universal kit for touch based vehicle commands may be provided, that can be integrated into substantially any vehicle computing system.

In some embodiments, the touch based vehicle command system 100 may enable a driver to enter characters, optionally full typing functionality, using the touch screen panels, such that the driver is not required to look at the touch panels or remove his or her hands from the steering wheel. For example, a driver may be able, using the system, to enter text messages, emails, search commands etc. into the vehicle computer system, smart phone, tablet or other computing or communications device, without looking at the touch screen or removing his/her fingers from the steering wheel, and depending on where the view screen is positioned, while keeping his or her eyes substantially on the road or straight ahead at substantially all times.

In some embodiments safety limitations may be executed to limited using of the touch based vehicle command system. For example, the system software may execute rules to stop data or command entry, or limit entry, when the steering wheel is in the lower or upper position, for example, when a corner is being navigated, or at selected speeds, according to weather conditions etc.

According to some embodiments, in place of or in addition to the view screen, the touch based vehicle command system may provide voice or audio feedback to the driver, to confirm driver function or data entry selections, suggest new options etc.

According to some embodiments the view screen may be integrated onto the vehicle windscreen.

Figure 7:
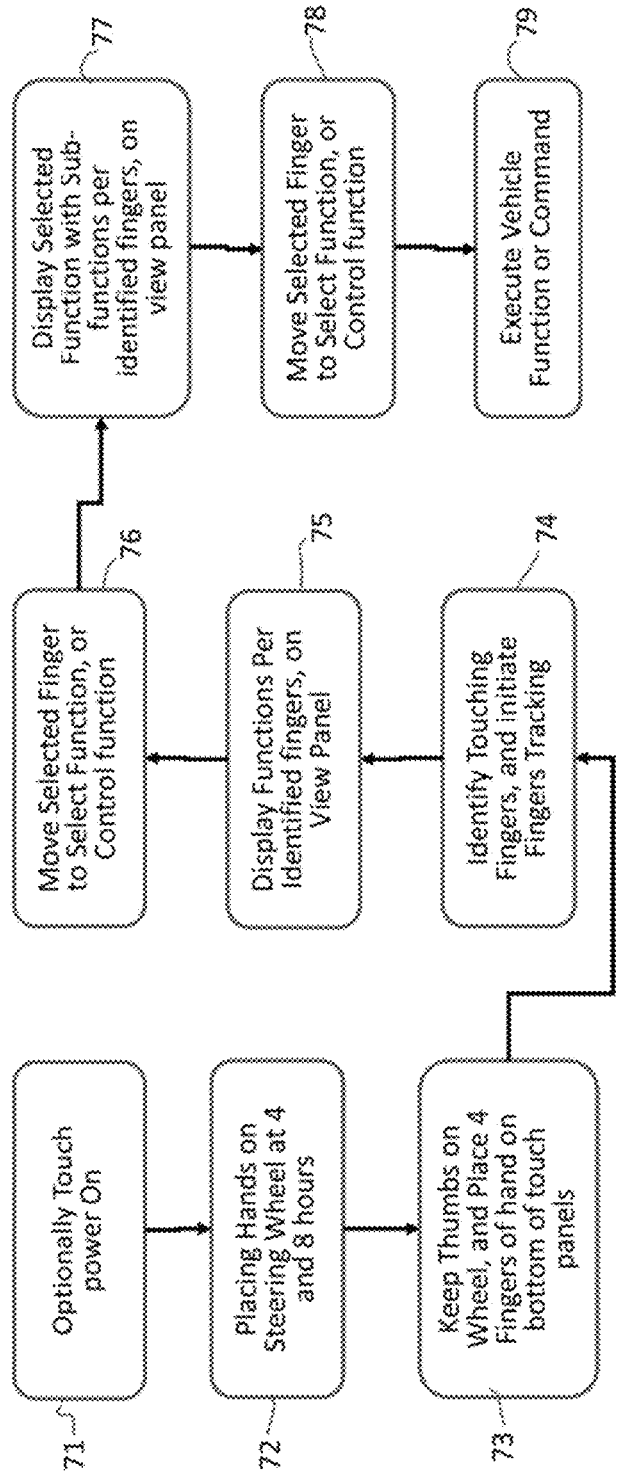
FIG. 7 is a flow chart describing an example of a usage of illustration of a system for enhanced command and control of vehicles, according to some embodiments.

FIG. 7 is a flow chart describing an example of a usage of illustration of a system for enhanced command and control of vehicles, according to some embodiments. As can be seen in FIG. 7, at step 71, the driver, optionally upon entering the vehicle or wanting to otherwise initiate the system, may push the On-Off switch to initiate the system start up, and also power up the touch panel(s). At step 72 the driver may place his or her hand(s) on the Steering Wheel, for example, at approximately 4 and 8 hour positions. At step 73 the driver may keep his or her thumb(s) on the Steering Wheel, and place the remaining fingers of 1 or 2 hands on the bottom of the touch panel(s). At step 74, in response to the user's touching of the touch panel, the connected computing system may identify the touching fingers, and begin tracking of their individual movement. At step 75 the connected computing system may instruct a connected view panel to display Functions per Identified fingers. At step 76 the driver may move a selected finger (or multiple fingers) to select a Function, enter data, enter a gesture, enter a character etc. At step 77 the selected Function or command may be displayed on the view panel(s), for example, with new or dynamic sub-functions assigned to the identified fingers. At step 78 the driver may move one or more fingers to select a sub-function, control function, enter a character etc. At step 79 the vehicle computer system may execute the vehicle function or command. Any combination of the above steps may be implemented. Further, other steps or series of steps may be used.

Figure 8B:
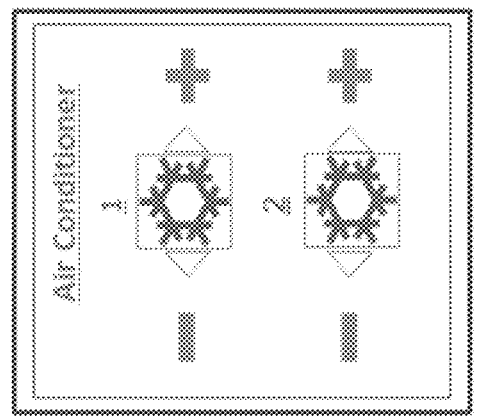
FIGS. 8A, 8B, and 8C are screenshots of examples of user interfaces associated with selected functions, according to some embodiments.
Figure 8C:
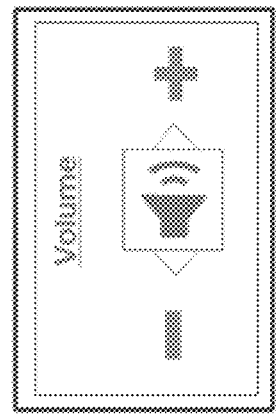
Figure 8A:
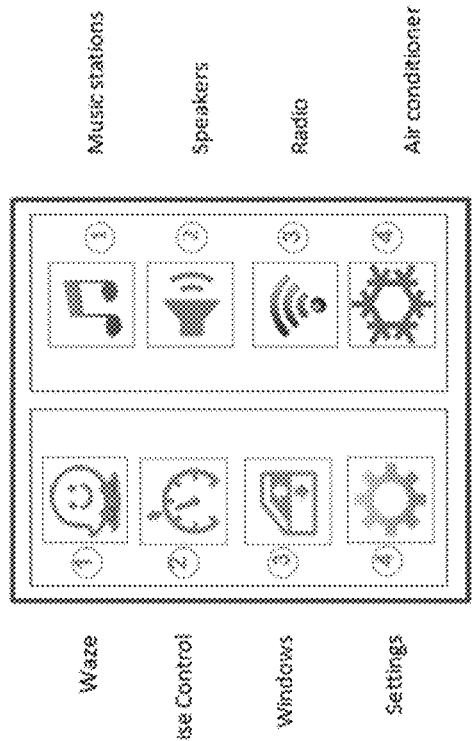

FIGS. 8A-8C are screenshots of examples of user interfaces associated with selected functions, according to some embodiments. As can be seen in FIG. 8A, each of identified fingers 1-8 may be assigned a function, which may be selected by movement of the relevant finger. In FIGS. 8B and 8C, as can be seen, the finger for a specific function or commands may be moved left or right, or up or down, to enable increasing or decreasing the power or performance of that command or function.

According to some embodiments, the touch based vehicle command system may be used to allow a driver to enter navigation commands or data, for example, in a navigation application like WAZE (see www.waze.com), substantially without removing hands form the steering wheel or looking at the touch screen device running the application.

According to some embodiments, the touch based vehicle command system may be used to allow a driver to enter an alarm or de-mobilizer code or command to unlock, start, lock a vehicle etc. In such a case a user may enter a vehicle, and be required to use the touch panel(s) to enter a code or command to enable the vehicle to operate.

According to some embodiments, the touch based vehicle command system may be used to allow a driver to gestures on the touch screen panel(s) to enter commands, instructions, data, characters etc.

The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A vehicle control system, comprising:
    a touch panel connected to a steering wheel, and being in communicative connection to a vehicle control processor, wherein the touch panel is configured face down relative to a driver, and the vehicle control system is adapted to track touches by multiple individually identified fingers on the touch panel, wherein each finger is identified solely by its location of contact on the touch panel and locations of contact of the other fingers; and
    wherein the vehicle control system has a mode for positioning touch zones,
    wherein one of the touch zones is positioned in the region of each location of contact of multiple fingers.

2. The system of claim 1, further comprising a view screen for displaying a touch related user interface, the interface adapted to show indications of the multiple individually identified fingers on the touch panel, and function options available for each of the identified finger.

3. An apparatus for vehicle command and control, comprising:
    a touch panel positioned faced down relative to a driver and portioned to be touched by the driver's fingers of one hand while the driver's thumb of the hand holds a steering wheel; wherein the panel is in communication with a view screen, enabled to display an indication of touch actions by multiple fingers touching the touch panel; wherein the touch panel includes touch sensors adapted to identify touches of multiple fingers of the driver; and wherein the touch sensors are associated with software for identifying and tracking touches of every finger individually out of the multiple fingers including identifying whether each of the touches is a sliding movement or a non-sliding touch
    wherein each finger is identified solely by its location of contact on the touch panel and locations of contact of the other fingers; and
    wherein the apparatus has a mode for positioning touch zones, wherein one of the touch zones is positioned in the region of each location of contact of multiple fingers.

4. The apparatus of claim 3, further comprising a keypad projector module to project a virtual interactive keypad/touch panel on a panel surface.

5. The apparatus of claim 3, wherein the software is an application that is in communication with a vehicle control application running on a computing system, the application adapted to monitor simultaneous touch of multiple fingers on the touch screen panel, to enable each of a driver's four fingers of one hand to enter vehicle control related instructions for the vehicle, while allowing the driver's hands to remain on the steering wheel and his or her eyes looking at the road.

6. The apparatus of claim 3, wherein the touch panel is positioned for contact by fingers of a first hand and the apparatus includes an additional touch panel positioned for contact by multiple fingers of a second hand, wherein the touch panels are positioned on the underside of the touch panels, so as to disallow user viewing of the touch panels, and wherein a user interface for vehicular command is provided on an associated view screen, the view screen to provide indications of the user touches on the apparatus.

7. The apparatus of claim 3, wherein the software is adapted to identify finger generated gestures for controlling vehicle functions without lifting a driver's hands off the steering wheel.

8. The apparatus of claim 3, wherein the apparatus includes an additional touch panel,
    wherein the touch panels are connected to a vehicle steering wheel, adapted to be repositionable to as to enable ergonomic positioned relative to the driver for touching by up to four of the driver's fingers on each touch panel while holding the steering wheel with the driver's thumb.

9. The apparatus of claim 3, wherein the apparatus includes an additional touch panel, the touch panels are part of a kit for universal vehicle command and control, comprising one or more wireless communication enabled touch screen panels adapted to be connected to a vehicle steering wheel, such that the panels may be ergonomically positioned relative to the driver, to allow the driver's thumb to rest on the steering wheel, and have the four other fingers rest behind the steering wheel or on the underside of the panels.

10. The apparatus of claim 3, wherein the kit includes a link to associated vehicle command and control Application software to connect the driver's touches on the panel to the vehicle computing system, via a vehicle related Application Program Interface (i.e., API).

11. The apparatus of claim 3, further comprising a device for virtual touch screen projection onto the touch panels.

12. The vehicle control system of claim 1, wherein the system includes a second touch panel connected to the steering wheel, and being in communicative connection to the vehicle control processor, wherein the second touch panel is configured face down relative to the driver, and adapted to track touches by multiple individually identified fingers.

13. The apparatus of claim 3, wherein the apparatus includes a second face down panel positioned to be touched by the driver's fingers of a second hand while the thumb of the second hand holds the steering wheel, wherein the second panel is connected to the steering wheel, and is in communicative connection to the vehicle control processor, wherein the second touch panel is configured face down relative to the driver, and adapted to track touches by multiple individually identified fingers.

14. The apparatus of claim 3, wherein the apparatus controls a vehicle navigation device.

15. The apparatus of claim 14, wherein the apparatus controls a vehicle radio control.

16. The apparatus of claim 15, wherein the apparatus enters text messages, enters emails, or enters search commands.

17. The system of claim 1, wherein the number of touch zones is equal to the number of the contact of the multiple fingers.

18. The system of claim 17, wherein each touch zone is associated with at least one different vehicle control function.

19. The system of claim 18, wherein the vehicle control system displays a vehicle control function associated with each contacted touch zone on a display.

* * * * *